(12) United States Patent
Lari et al.

(10) Patent No.: US 7,412,700 B2
(45) Date of Patent: Aug. 12, 2008

(54) PRODUCT PACKAGING AND INSTALLATION MECHANISM

(75) Inventors: Mohammad Shoaib Lari, Palo Alto, CA (US); Rajendra S. Pingte, Foster City, CA (US); Srinath Krishnaswamy, Fremont, CA (US); Douglas James McMahon, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 599 days.

(21) Appl. No.: 10/848,635

(22) Filed: May 18, 2004

(65) Prior Publication Data

US 2005/0262502 A1    Nov. 24, 2005

(51) Int. Cl.
  *G06F 9/445* (2006.01)
  *G06F 12/00* (2006.01)
(52) U.S. Cl. .................. 717/175; 717/169; 707/205
(58) Field of Classification Search .............. 717/106, 717/112, 140, 169, 175, 151
See application file for complete search history.

(56) References Cited

U.S. PATENT DOCUMENTS

| | | | | |
|---|---|---|---|---|
| 5,950,010 A * | 9/1999 | Hesse et al. | .............. | 717/178 |
| 6,131,192 A * | 10/2000 | Henry | .............. | 717/175 |
| 6,381,742 B2 * | 4/2002 | Forbes et al. | .............. | 717/176 |
| 6,530,080 B2 * | 3/2003 | Fresko et al. | .............. | 717/166 |
| 6,718,373 B1 * | 4/2004 | Bearden et al. | .............. | 709/220 |
| 7,062,761 B2 * | 6/2006 | Slavin et al. | .............. | 717/151 |
| 7,155,710 B2 * | 12/2006 | Breckner et al. | .............. | 717/168 |
| 7,185,154 B2 * | 2/2007 | Wong et al. | .............. | 711/156 |
| 2004/0230971 A1 * | 11/2004 | Rachman et al. | .............. | 717/175 |
| 2005/0034120 A1 * | 2/2005 | Fisher et al. | .............. | 717/175 |
| 2005/0060314 A1 * | 3/2005 | Wang et al. | .............. | 707/7 |
| 2005/0065953 A1 * | 3/2005 | Bower et al. | .............. | 707/101 |
| 2005/0169503 A1 * | 8/2005 | Howell et al. | .............. | 382/115 |
| 2007/0073913 A1 * | 3/2007 | Meyer et al. | .............. | 710/8 |

OTHER PUBLICATIONS

Rick Borup; Understanding Windows Installer; Oct. 2003; Great Lakes Great Database Workshop in Milwaukee, Wisconsin, Session 8.*

(Continued)

*Primary Examiner*—Tuan Dam
*Assistant Examiner*—Hahn T Bui
(74) *Attorney, Agent, or Firm*—Silicon Valley Patent Group LLP; Omkar Suryadevara

(57) ABSTRACT

Files of software to be installed in a computer are packaged as follows. A source file is prepared to contain at least a declaration of an array of sufficient space to accommodate the files to be packaged. The source file is compiled into an executable file. Thereafter, the array in the executable file is overwritten with data from each file being packaged. Depending on the embodiment, the address of where each file begins in the executable file and each file's name may be stored in the same executable file or in a different file. The stored file names are used to identify an address of a file from its name, when the named file is first accessed. In several embodiments, the operating system loads the executable file as a library that is automatically shared by multiple instances of the application (or by multiple applications), to efficiently use physical memory.

28 Claims, 7 Drawing Sheets

OTHER PUBLICATIONS

Makemsi (v08.040). Make MSI based installation files; retreived from <http://dennisbareis.com/makemsi.htm> on Feb. 27, 2008.*
How to use the Orca database editor to edit Windows Installer; Article ID: 255905; Retreived from <http://support.microsoft.com> on Feb. 27, 2008.*

Writing Custom Data To Executable Files In Windows and Linux, believed to be published Nov. 26, 2001 at community.borland.com.
Entire Prosecution History of U.S. Appl. No. 11/437,899, filed May 19, 2006.

* cited by examiner

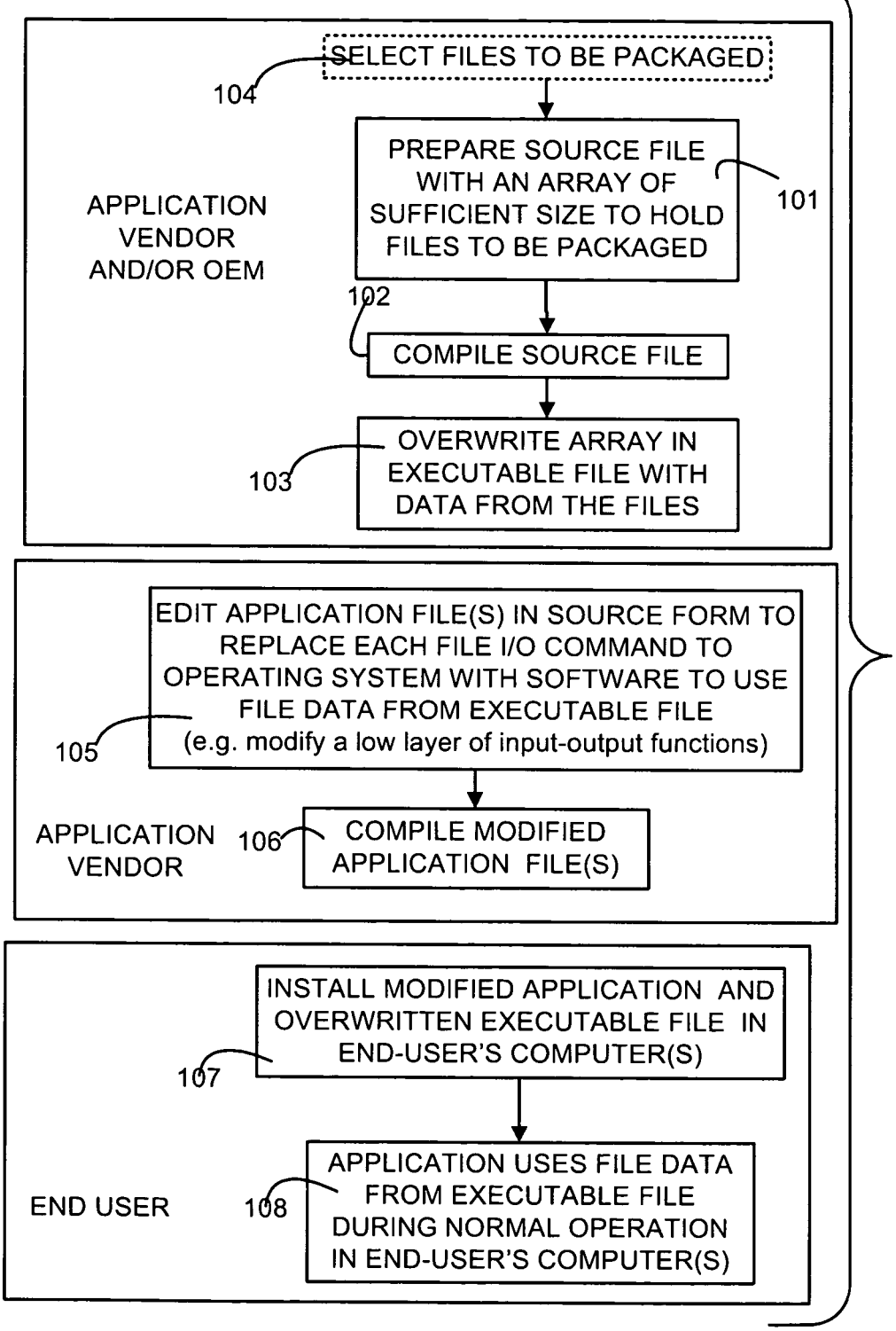

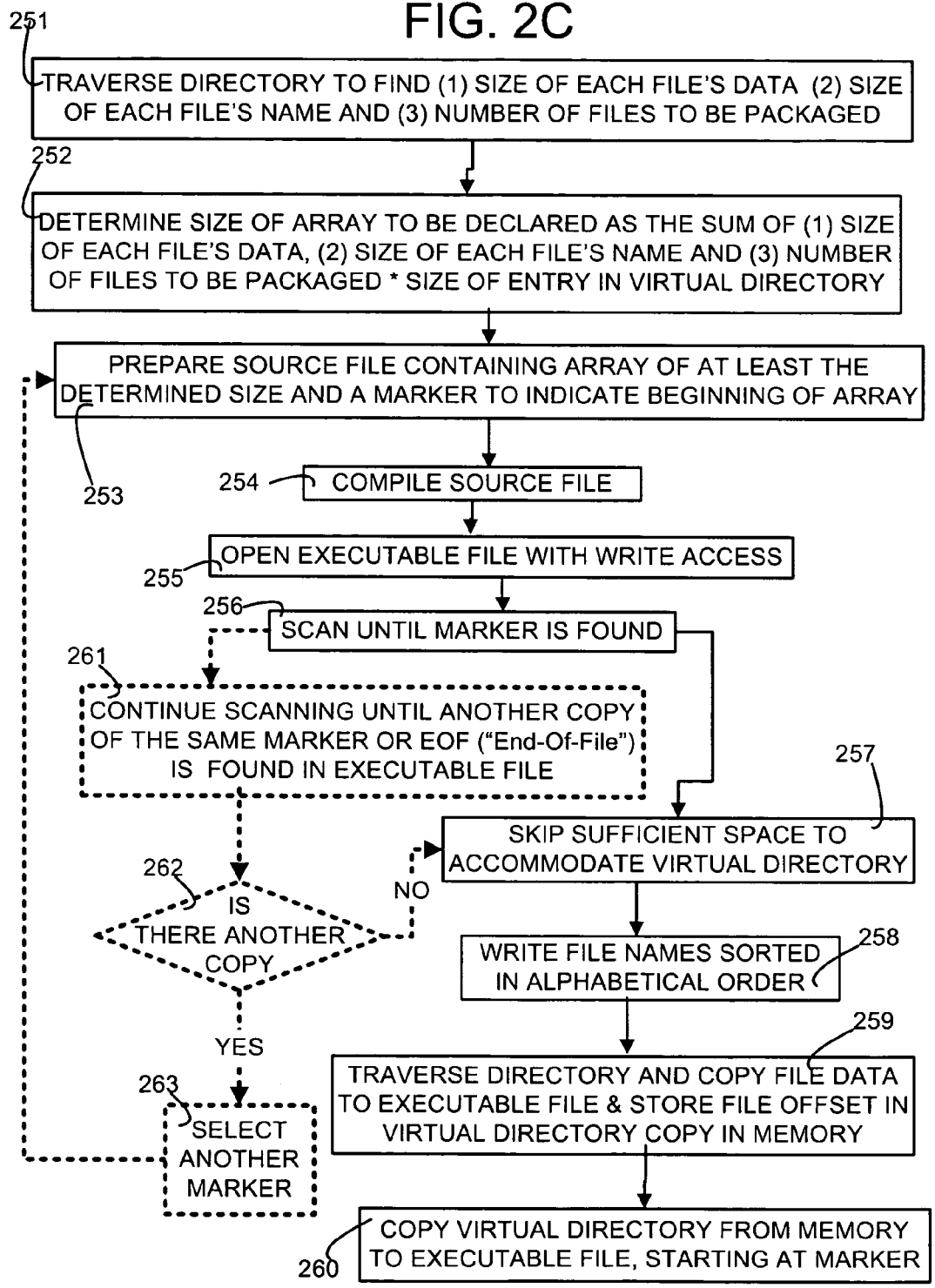

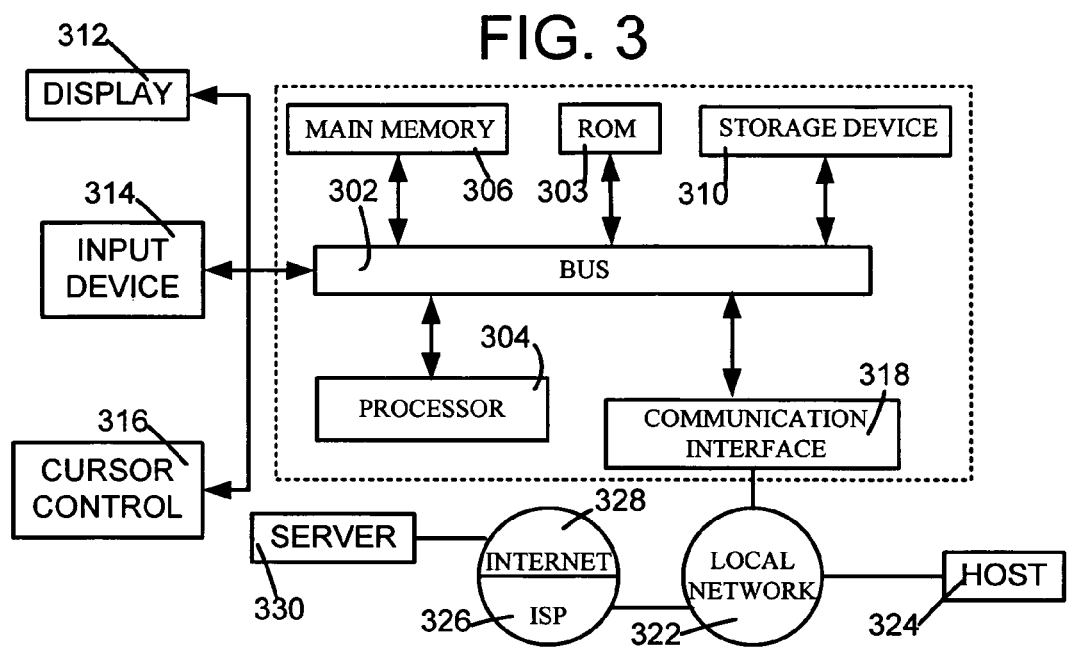

PRODUCT PACKAGING AND INSTALLATION MECHANISM

BACKGROUND

Installing a software product, such as tax preparation software (e.g. TurboTax® available from Intuit, Inc.) in a personal computer requires the copying of numerous files in numerous directories. Specifically, when TurboTax® is being installed at C:\Program Files\TurboTax, a number of subdirectories (also called "folders") are created. For example, one subdirectory is created for holding the executable "ttax.exe" and related shared libraries, which are files with extension ".dll" such as cdac14ba.dll, clientmesndll.dll and mvmg13n.dll, another subdirectory is created for holding image files, which are files with the extension ".bmp" such as fidelityinvestments_0.bmp and cititrade_0.bmp, and yet another subdirectory is created for holding tax forms, such as fdi02f05.1pe and fdi02ttx.1pe. Although only a handful of subdirectories have been mentioned, there may be an entire tree of such subdirectories which is several levels deep. Moreover, although only a few files have been mentioned above, a typical installation of today's software products requires the set up and copying of 100s of files or even 1000s of files, depending on the software product.

The process of installing a software product containing such a vast number of files in numerous subdirectories (of which the end user has no knowledge) is simplified in today's computers by use of software that is typically called an "installer". The installer not only copies all necessary files from a storage medium (such as one or more CD-ROMs or floppy disks), but also decompresses the files (if necessary). The installer may also update one or more configuration files and/or environment variables which reside in the computer irrespective of the software product being installed.

One prior art installer is described in U.S. Pat. No. 6,131,192 granted to Henry on Oct. 10, 2000 and entitled "Software Installation". According to U.S. Pat. No. 6,131,192 (see column 1, lines 30-56) a single executable file containing the prior art installer may be transferred from a source, such as a website on the Internet, to any disk drive that can be written to and is associated with the computer to which the software product is to be installed. U.S. Pat. No. 6,131,192 also states (see column 1, lines 56-62) that the same single executable file may also contain the source of a tree of files, in addition to the prior art installer (called "shell program" by U.S. Pat. No. 6,131,192).

Such a shell program (or installer) of the prior art may be executed to first install the software in a temporary directory, followed by, among other steps, (a) decompressing one or more individually compressed files in the tree of files, (b) modifying the computer's configuration files, and (c) installing of decompressed files in a target directory (at which the software product is to be permanently installed). U.S. Pat. No. 6,131,192 also describes (see column 3, lines 23-30) an improved installer that contains software materials necessary for the installation of a software product on a computer, and that, once executed, searches for and uses only a small amount of temporary storage space in the process of getting the files of the software product in the target directory, causes the software product to be set up on the computer, and cleans-up the temporary storage space. U.S. Pat. No. 6,131,192 is incorporated by reference herein in its entirety, as background to this invention.

See also U.S. Pat. No. 6,718,373 granted to Bearden, et al. on Apr. 6, 2004 and entitled "Method and system for installing files in a computing system" that is also incorporated by reference herein in its entirety, as background to this invention.

SUMMARY

In accordance with the invention, a number of files of data that can be shared (e.g. by multiple instances of an application or by multiple applications) are packaged as follows. A source file is prepared to contain at least an array that is declared to be static and to have sufficient space to accommodate the files to be packaged. The source file is compiled into an executable file. Thereafter, the array in the executable file is overwritten with data from each file being packaged.

Depending on the embodiment, the address of where each file begins in the executable file and each file's name may be stored in the same executable file or in a different file. The stored file names are used to identify an address of a file from its name, when the named file is first accessed. In several embodiments, the operating system loads the executable file as a library that is automatically shared by multiple instances of the application (or by multiple applications), to efficiently use physical memory. All files whose data is written to the executable file, as described above, are thereafter distributed to end users, by simply distributing one file, namely the executable file.

Moreover, the executable file is used by one (or more) application(s) as follows: the file name is used to identify the file address, and the file data is read sequentially, starting from the file address. A virtual file system may be implemented in some embodiments, to provide a transparent interface to one or more application(s) that access the files that have been packaged (into the executable file), in the same manner as if the files were located in a directory and accessed through the operating system (e.g. file open, file seek, file read and file close may be implemented on the executable file). Functions for the virtual file system may be located in the above-described executable file or in a different file, depending on the embodiment.

BRIEF DESCRIPTION OF THE DRAWINGS

FIG. 1A illustrates, in a flow chart, acts performed in accordance with the invention, to create files to be distributed, in the form of an executable file modified by having its array overwritten by data of files being packaged, and one or more application file(s) modified to use file data from the overwritten executable file.

FIG. 2C illustrates, in a detailed flow chart, a method used in some embodiments to produce the overwritten executable file of FIG. 2A.

FIG. 3 illustrates, in a high level block diagram, hardware included in a computer that may be used to perform the method of FIG. 2C in some embodiments of the invention. A computer of the type shown in FIG. 3 can also be used as an end user's computer, to receive an installation of the overwritten executable file and the modified application.

DETAILED DESCRIPTION

Figure 1B:
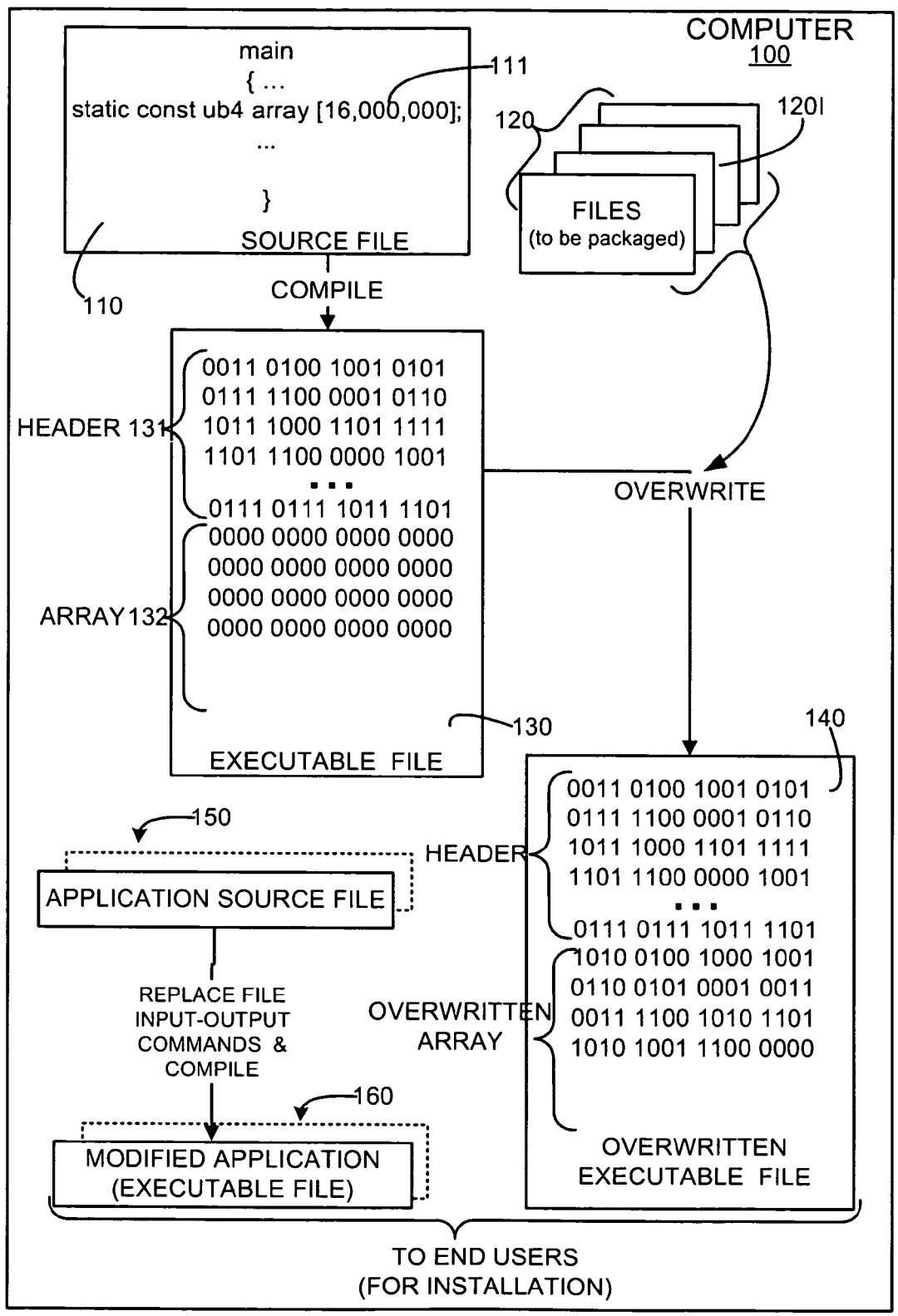
FIG. 1B illustrates, in a high-level block diagram, various files used in the method of FIG. 1A, including files to be packaged, a source file, an executable file resulting from compiling the source file, an overwritten executable file resulting from overwriting of its array with file data, application source file(s), and modified application (in executable form) resulting from compilation after replacing of operating system file input-output commands with software to use file data from the overwritten executable file.

Acts 101-108 (FIG. 1A) are performed in several embodiments in accordance with the invention, to package a number of files 120 (FIG. 1B) of data that can be shared (e.g. by multiple instances of an application or by multiple applications, which form(s) a software product) into a single executable file. In some embodiments, all of acts 101-108 are performed manually. In other embodiments, some acts are preformed manually while other acts are performed automatically. Finally it is also possible for all acts 101-108 to be performed automatically, under manual supervision and/or manual control (e.g. via scripts or commands from humans). In one embodiment, only acts 101-103 are performed automatically, specifically by a software utility called "genezi" which is described below in greater detail.

The genezi utility may be used either by a vendor of the application(s) or by an intermediary (such as an Original Equipment Manufacturer (OEM) or by a Value Added Reseller (VAR), or even an information technology (IT) department of a large corporation). The availability of the genezi utility may be limited to only the application vendor in case of some operating systems (such as Windows) but available to such intermediaries in case of other operating systems (such as Unix). Moreover, acts 105-106 are performed manually in most embodiments. Also, acts 105-106 are performed by the vendor of application(s) in many embodiments. However, in other embodiments, acts 105-106 can be performed by an intermediary (of the type described above), e.g. if source code is available to the intermediary. Finally, acts 107-108 are performed manually at an end-user's computer in most embodiments. The end-user may be either a customer of the application vendor or may be an employee of a corporation that employs the intermediary. An example of the application (and product) is the database management system called "ORACLE Database 10g", available from Oracle Corporation of Redwood Shores, Calif.

The files 120 (FIG. 1B) that may be packaged by performing acts 101-103 are ideally files that are "read-only", such as files containing text and/or graphic information to be displayed to humans, e.g. error messages. Such files 120 are accessed on demand basis, and significant amount of disk I/O takes place for events which are not really error conditions but happen routinely such as in the case of "end-of-data", null, truncation, and other warnings and information only messages. Using a shared library as described below to hold the data of files 120 provides automatic caching of the data by the operating system.

Note that files 120 that are to be packaged may be selectively packaged by an intermediary depending on the nature of the end users to whom the shared library is to be released. For example, if the end users of the shared library are Japanese, then the intermediary may select (as per act 104 in FIG. 1A) only files containing information in the Japanese language (e.g. only files containing error messages in the Japanese language) as being the files 120 that are to be packaged. Selection performed in act 104 excludes files containing the same error messages in other languages, such as French, German, Italian, Spanish and Korean. While language is just one attribute that may be used to limit the files to be included in a shared library, as will be apparent to the skilled artisan, numerous such attributes (e.g. character set such as ASCII or Unicode) may be used by an intermediary to appropriately customize the shared library to the end user. In contrast, an application vendor may include, in a shared library that the vendor creates, a complete set of files for a full installation of the application, as to-be-packaged files 120, so that the application may be sold to a wide range of end users (e.g. all languages).

An executable file that is sufficiently large to hold all such files 120 to be packaged is created in these embodiments, by performing acts 101 and 102 (FIG. 1A). Specifically, in act 101 (FIG. 1A), a source file 110 (FIG. 1B) is prepared (in a high level language, such as the "C" language) to contain therein at least a statement 111 declaring an array (FIG. 1B). The array is declared to be static and have sufficient space to accommodate all files 120 (FIG. 1B) that are to be packaged. The size of the array used in act 101 depends on whether or not act 104 is performed, because act 104 significantly reduces the size of the array to be created in act 101.

The size of the array declared in statement 111 may be determined in some of these embodiments based on the total space occupied by to-be-packaged files 120 on a disk (or other storage media). An array that is larger than the total size of files 120 may be declared in statement 111 depending on the embodiment, to accommodate additional information such as a directory, and/or a listing of the names of all the files and/or a description of the version of each file. However, in certain embodiments such additional information may be stored in a different file in which case an array of size precisely equal to the total size of files 120 may be declared in statement 111.

Also in some embodiments, the array size may be declared in statement 111 to be larger than the total size of files 120 by a certain percentage (e.g. 10%) or by a fixed amount (e.g. 1 MB) to accommodate future needs in case of growth of data in one or more of files 120 (for example in case a patch is applied). The precise size of the array declared in statement 111 is not a critical aspect of the invention, as long as it is greater than or equal to the total size of files 120. Note that the size of the array is typically on the order of several MBs, e.g. 10 MB or 65 MB for typical applications being distributed (and installed) in today's world.

Source file 110 (containing an declaration 111 of an appropriately sized array) is then compiled and linked into an executable file 130 (FIG. 1B), e.g. by use of a C compiler and OS linker if the source file 110 contains instructions expressed in the C programming language. Executable file 130 contains an array 132 that may be located after a header 131 that has a specific format depending on the operating system ("OS"). Also depending on the operating system, the instructions of executable code obtained by translation of source file 110 into machine language may be located anywhere relative to header 131 and array 132 or e.g. such code may be located following array 132 or preceding array 132 but following header 131. Embodiments that are based on Linux operating system use the industry-standard Executable and Linking Format ("ELF") format for executable file 130, while embodiments based on the WINDOWS operating system from MICROSOFT Corporation use the Portable Executable ("PE") standard for file 130. Although the two formats differ in their inner structures, both formats define a file that is divided into several parts, one of which is the header 131.

Embodiments that are knowledgeable about a particular operating system's executable file format find the location of array 132 from use of information within header 131. Embodiments that do not rely on knowledge of the executable file format may use a marker to denote the beginning of array 132, e.g. by storing a unique bit pattern in the first few bytes of the array as discussed in greater detail in reference to FIG. 2A. The just-described two classes of embodiments (OS knowledgeable & without marker or OS agnostic & with marker) have their respective advantages and disadvantages as will be apparent to the skilled artisan (e.g. the latter embodiments need less maintenance).

Regardless of how the location of array 132 is found in the various embodiments, all embodiments determine an offset for the beginning of array 132 relative to the beginning of the executable file 130. This offset is hereinafter referred to as a "base" address of certain space in executable file 130 that is available for storing the data of files 120, and optionally for storing the above-described additional information (such as a directory). Next, as per act 103 in FIG. 1A, executable file 130 is opened for write access, and array 132 is overwritten with data from each file being packaged ("file data"), thereby to result in file 140 (FIG. 1B).

At this stage, as will be apparent to the skilled artisan in view of this disclosure, overwritten executable file 140 contains the data of numerous files that were being distributed to end users. As noted above, the files 120 that are included may be selected by performance of act 104 in which case the number of files 120 that are packaged is smaller than if all such files were included. Distribution of the single file 140 eliminates the need to distribute the numerous files of the prior art. In many embodiments of the invention, applications of the prior art are modified to access the file data from file 140 (thereby to eliminate extraction of these files from file 140, and installation of each individual file).

Specifically, as illustrated by act 105 in FIG. 1A, the application files 150 in source form are edited (manually in most embodiments, although automatic editing can also be done in some alternative embodiments) to replace each file input-output command normally serviced by the operating system with software to access and use one or more files in executable file 140. Note that in some embodiments, the changes are limited to a low level layer of software in which file input-output instructions are changed. In one such embodiment, the changes to the application are to use a set of functions called "virtual file system" which conditionally use a shared library (e.g. file 140 of FIG. 1B) on a library path (as discussed in detail below) While the applications of some embodiments are programmed to access the file 140 only conditionally (e.g. after checking that file 140 exists and if it doesn't exist then defaulting to the operating system), other embodiments use file 140 unconditionally (i.e. not rely on the operating system for any of files 120 that have been packaged).

Next, the modified application files (not shown in FIG. 1B) are compiled in the normal manner (as per act 106 in FIG. 1A), resulting in one or more executable files 160 for the modified application(s). Therefore, it is these modified application executable files 160 that are distributed to end users, along with the overwritten executable file 140.

Figure 1C:
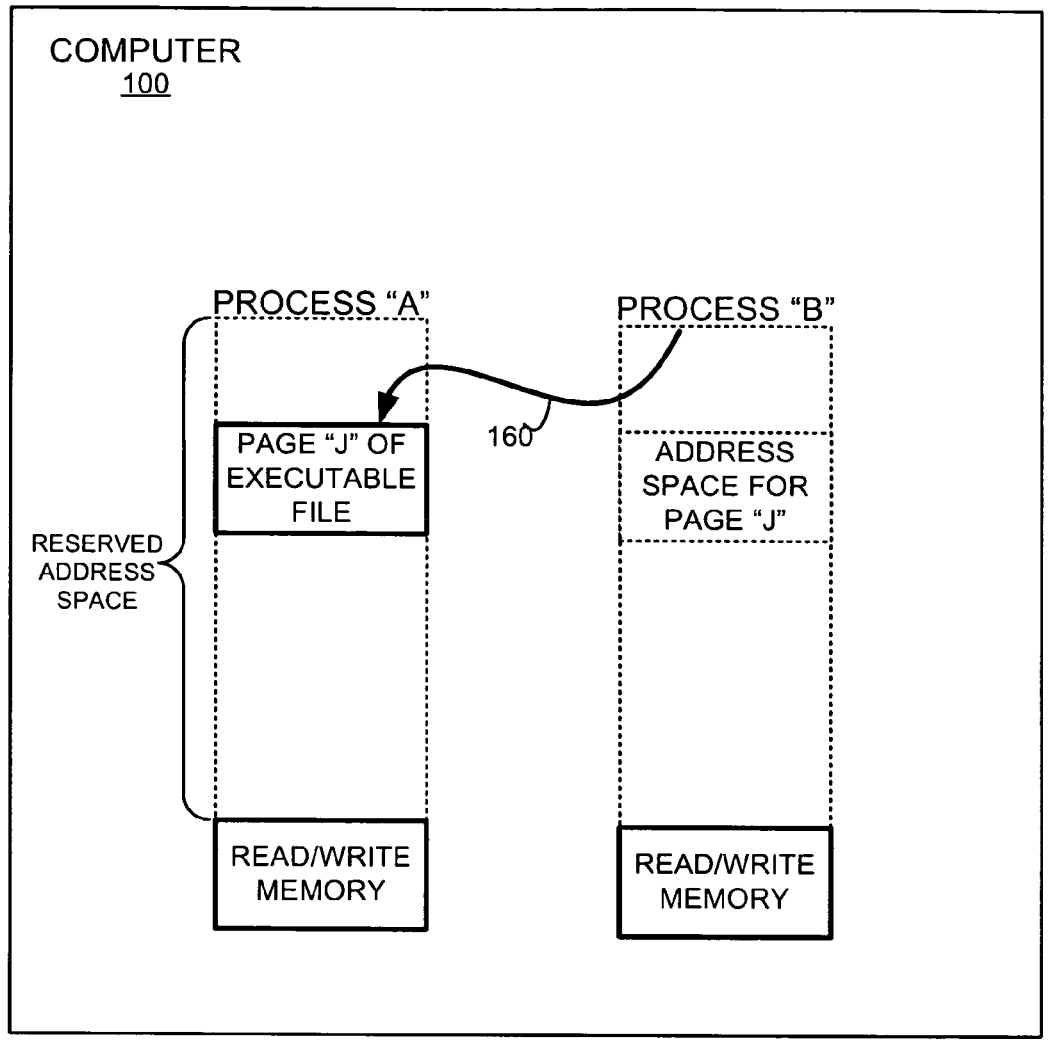
FIG. 1C illustrates, in a memory map, the allocation (and use) of a single page of physical memory to temporarily hold, during run time, a portion of the overwritten executable file for access by each of two processes A and B, when both processes access one or more files (or a portion thereof contained in the same page "J".

In several embodiments, in act 107 (FIG. 1A) the end user's operating system is instructed to treat the overwritten executable file 140 of the type described above as a shared library (e.g. as a ".so" file in Solaris) or Dynamic Link Library (e.g. as a ".dll" file in WINDOWS). In doing so, the operating system loads file 140 (FIG. 1B) in a shareable manner as illustrated in FIG. 1C. Specifically, although file 140 (FIG. 1B) is fairly large (e.g. 65 MB in size), the entire file is not loaded into physical memory when a process "A" of application 160 (FIG. 1B) executes. Instead, process "A" reserves address space of the size of file 140 (in preparation for addressing the file data located herein), but one or more pages of file 140 are loaded by the operating system into physical memory only as and when needed. For this reason, in FIG. 1C, only a single page "J" is shown loaded in memory and in use by process "A".

When another process "B" that also uses file 140 is executed, this process "B" also reserves address space of the size of file 140. If process "B" needs the same file data as process "A" (or file data from the same page "J"), then the operating system does not load another copy of page "J" and instead translates the virtual addresses to physical addresses appropriately (as shown by arrow 160 in FIG. 1C) to enable process "B" to directly access page "J" that is already in memory. Therefore, instructing the operating system to treat file 140 as a shared library (as per act 107 in FIG. 1A) uses less memory than if each process were to receive its own copy of file 140 in physical memory.

Therefore, when file 140 is installed as a shared library, multiple instances of an application (or multiple applications) efficiently use (as per act 108 in FIG. 1A) a single copy in physical memory. Note, however, that in other embodiments of act 107, the executable file 140 may be installed as a non-shareable file. And in still other embodiments, instead of an executable file, a data file is used via memory mapping I/O (in an alternative act 107) to support a virtual directory as discussed in the next paragraph, in which case the above-described acts of preparing the source file (as per act 101 in FIG. 1A) and compiling the source file (as per act 102) are avoided.

An alternative embodiment in accordance with the invention creates a data file containing information from to-be-packaged files 120, in the normal format of a binary file, and the data file is used directly via memory mapping functions of the operating system in the end user's computer. Note that in this alternative embodiment, the data file is created instead of creating an executable file 130 (or file 140) and for this reason the data file does not have header 131, for example. Since the data file of this embodiment contains read-only data, so this data file is mapped by the application in a share-able manner, such as using the MAP_SHARED flag on Unix. A virtual directory also included in the data file of this embodiment provides information about the memory region where each of packaged files 120 is mapped (offset and size), and the memory mapping function of the operating system (such as mmap on Unix) returns a memory pointer to the data of each file 1201 after the mapping is done. The Unix mmap( ) function allows access to resources using address space manipulations instead of the read/write interface. Once a file is mapped by mmap( ), all a process has to do to access the file is simply use data at the address to which the file is mapped. In this embodiment, a virtual file system is implemented with a read function (e.g. lfvread) that simply copies data from the location of a given file 1201 (which is a memory location) to the end user's buffer just as it does in embodiments that use overwritten executable file 140. When a file 1201 is closed by the application, the alternative embodiment's virtual file system implements a close function, to unmap the address space of the specific file 1201 that is being closed, by using the operating system's memory unmap function (such as munmap on Unix).

Another embodiment also does not use a compiler/linker, but does in fact create an operating system specific executable file (e.g. the ELF-format or PE-format file as described above). In this embodiment, an application is knowledgeable about the executable format of the end user's operating system and uses this format to directly generate file 130 (FIG. 1B), for example by opening a file for write access followed by writing of header 131 followed by writing of a blank array, with array size determined from the total size of files 120 as noted above. File 130 may be directly generated in this manner, either as an object file or as an executable file, depending on the implementation. As noted above, in this embodiment, when generating executable file 130 directly, a compiler/linker is not used (because a source file is not even created). Thereafter, data from files 120 is used to overwrite executable file 130, in a location therein where the array is present, resulting in overwritten executable file 140. During overwriting, the array's location as known from knowledge of the executable file's format may be used in some implementations although other implementations may use a marker as described above.

Yet another embodiment directly generates an executable file 140 that already contains the information from files 120, without generating file 130. Specifically, this embodiment uses the known file format to insert all the necessary information for header 131 followed by insertion of information from files 120 at the location where the array would have been located, followed by any necessary information at the end of file 140 (such end-of-file information (e.g. a checksum) may or may not be present, depending on the individual file format).

Figure 2A:
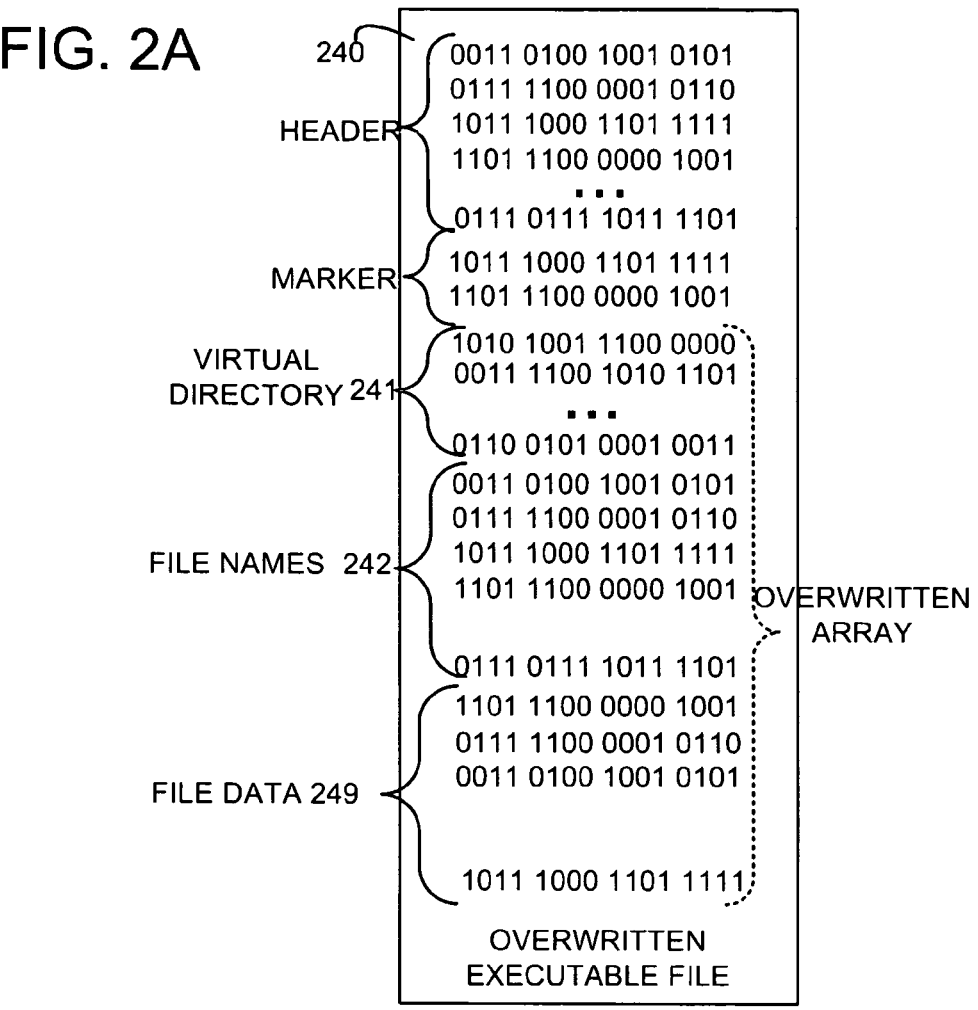
FIG. 2A illustrates, in detail, the structure of the overwritten executable file in some embodiments of the invention.
Figure 2B:
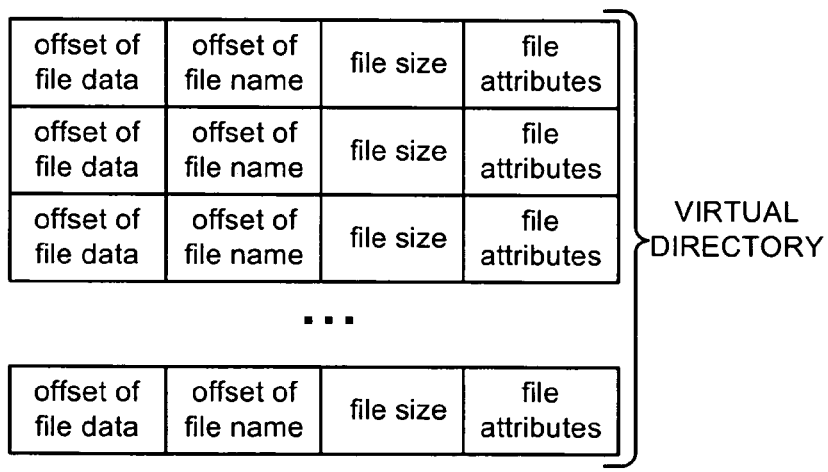
FIG. 2B illustrates, in detail, the structure of a directory (called "virtual directory") that is included in the overwritten executable file of FIG. 2A.

Although several embodiments have been described above in reference to FIGS. 1A-1C, one exemplary embodiment is described below in reference to FIGS. 2A-2C with the understanding that this description is merely illustrative and is not to be used to limit the scope of the invention. Specifically, in the exemplary embodiment of FIG. 2A, an overwritten executable file 240 is prepared in a manner similar to that discussed above for file 140 except for a few differences as noted below. File 240 includes a marker that helps in locating the beginning of the array. Moreover, the array of file 240 is used to store therein not only the file data (of all the files being packaged) but also certain additional information about these files in two additional structures, one structure 241 is called "virtual directory" and is further illustrated in FIG. 2B, while another structure 242 is a list of null terminated character strings of the names of all files.

Virtual directory structure 241 of this exemplary embodiment contains an entry (i.e. record) with four fields for each file stored in overwritten executable file 240: an offset of where each file's data begins in the executable file ("file address"), another offset of where each file's name begins in file list structure 242, the size of each file and file attributes (such as the version number of the file and/or creation date). The just-described offsets are relative to the beginning of the above-described base address of the array in file 240. For example, the file address of the first file in directory 241 is equal to the sum of the size of directory 241 and the size of file names list 242, and the offset of the first file's name is simply the size of directory 241. The size of directory 241 may be calculated as the number of files * (4 bytes*3+128 bytes), assuming there are three fields (two offsets and one size) of size 4 bytes and one field (attributes) of size 128.

In the exemplary embodiment, calculation of the size of the directory depends on the number of files that are to be packaged. Therefore, a directory tree on a disk where the files are currently located is traversed, to accumulate all information necessary to prepare the source file (not shown in FIG. 2A). Specifically, during such traversal, as illustrated by act 251 in FIG. 2C, the size of each file's data is determined (by computer 100, FIG. 1C) to obtain an estimate of the size of file data 243 (FIG. 2A), and the size of each file's name is also determined to obtain an estimate of the size of file names list 242. As noted above the number of files is also determined, to obtain an estimate of the size of virtual directory structure 241. Thereafter, as per act 252 (FIG. 2C), the size of the array to be declared is determined, as the sum of the size of each file's data, the size of each file's name and the number of files to be packaged * size of an entry in directory structure 241.

In addition, during the tree traversal, the file names are also accumulated, for future use in act 258 (discussed below). Next, as per act 253 (FIG. 2C), the source file is prepared to contain an array of the size that is determined in act 252. The source file of this embodiment is also prepared to include a marker, such as predetermined bit pattern that is, for example 16 bytes long. Next, the source file is compiled (as per act 254) resulting in an executable file that is overwritten as discussed next.

Specifically, as per act 255, the executable file is opened for write access by computer 100. Next, as per act 256, the executable file is scanned until the marker is found. Then, space in the executable file, sufficient to accommodate the virtual directory (i.e. size of directory 241 calculated as noted above) is skipped, and the names of all files that are to be packaged are written (as per act 258) into the list 242. In this particular embodiment, the file names that were accumulated in act 251 are sorted in alphabetical order and the sorted names are written into list 242, although in other embodiments the file names may be written unsorted.

Also, as per act 259, the above-described directory tree is traversed again although this time the files are read in alphabetical order, and the data in each file is copied into the executable file, starting with the first file's data located immediately after file list 242. After each file is copied, the actual number of bytes that have been copied for the file as well as the offset for beginning of the file data for this file are stored in a data structure in memory that has the same structure as the virtual directory of FIG. 2B (except for being located in memory rather than on disk). Note that the offset for the file name was already inserted in this structure at the time the file names were written into list 242. Next, the offset for the beginning of a next file is calculated, and used in the next iteration for copying the data of the next file. After the data of all files has been copied, the data structure in memory is written to the disk as per act 260 (FIG. 2C), i.e. into the space for virtual directory 241 in the executable file 240.

Executable file 240 that has been overwritten as discussed above is then distributed with the application files to end users for installation in their computers. After installation, the file data in executable file 240 is used by one (or more) application(s) as follows (if the shared library is present): a binary search is performed on virtual directory 241 to find an entry for a file of a given name (e.g. the file name is compared with a file name at the center of directory 241, and if on the left side then the process is repeated on the left side and if on the right side the process is repeated on the right side). Once an entry for the file is found, then the corresponding offset of file data is used as a file pointer (and file data is read sequentially until the file size amount of data has been read).

Figure 2D:
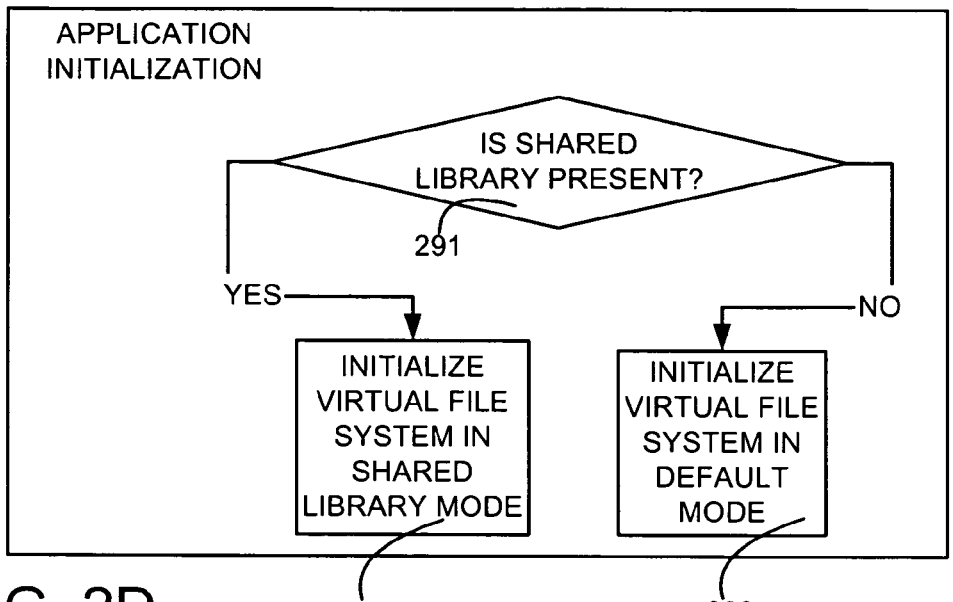
FIGS. 2D and 2E illustrate, in an intermediate level flow chart, acts performed during application initialization and application file I/O respectively.
Figure 2E:
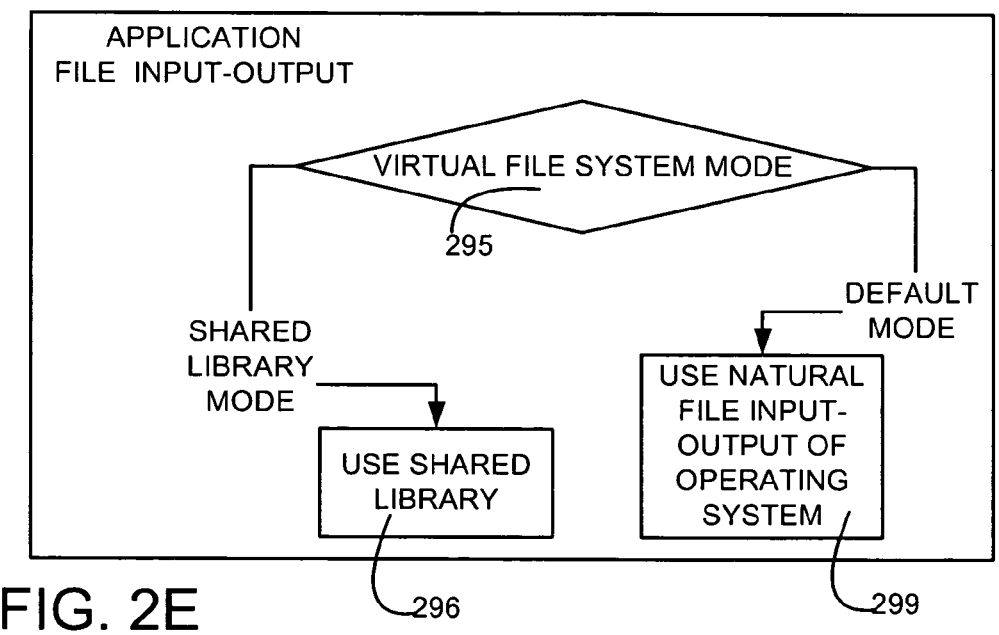

FIGS. 2D and 2E illustrate the initialization and use of a shared library by the virtual file system of one embodiment. Specifically, as illustrated in FIG. 2D, during initialization, one embodiment of computer 100 that has been programmed with application 160 (FIG. 1B) checks in act 291 as to whether or not a shared library (e.g. executable file 140) is present. Depending on the embodiment, act 291 can check (a)

the presence of the shared library in a library path of the operating system or (b) a setting in an environment variable, or (c) the presence of the library in a directory determined by an environment variable. For example, the application may attempt to load the shared library from a location specified in an environment variable. If successful, then computer 100 goes to act 292 and initializes the virtual file system to function in the shared library mode in future (e.g. by setting a flag called "VIRTUAL FILE SYSTEM MODE"). If unsuccessful in act 291, then computer 100 goes to act 293 and initializes the virtual file system to function in the default mode.

Thereafter, at a future time, when a file is to be accessed, computer 100 performs act 295 to check the initialization of the virtual file system and depending on the initialized value, performs act 296 or alternatively act 299. For example the above-described flag "VIRTUAL FILE SYSTEM MODE" is checked and if the value stored in the flag is "SHARED LIBRARY MODE" then act 296 is performed and alternatively if the value is "DEFAULT MODE" then act 299 is performed. When performing act 296, the shared library is used as noted in the previous paragraph. When performing act 299 the input-output interface of the operating system is used in the normal manner.

Note that although several acts are shown in FIG. 2C as being performed one after another, there may be any number of acts that occur between such acts. For example, although after performance of act 256, the next act 257 is performed directly thereafter, in some embodiments additional acts 261-263 are performed as discussed next. Specifically, in act 261 the executable file 240 is scanned even after the marker is found in act 256 to see if the end of file (EOF) is reached or if another copy of the marker is found (as per act 262). If another copy of the marker is found (which is an unlikely coincidence), then a different marker is selected (as per act 263) followed by preparation of the source file now using this different marker (as per act 253). If in act 262, another copy of the marker is not found, then act 257 is performed in the above-described manner.

In some embodiments, acts 251-263 shown in FIG. 2C are automatically performed in a computer programmed with a utility function called "genezi" which is described next (for details, see Appendices A and B which are incorporated by reference herein in their entirety). Specifically, the utility genezi takes as input the list of directories and file extensions to locate all the files that have to be packaged into the shared library executable file 240. The utility genezi is executed from a home directory (e.g. as specified in the environment variable ORACLE_HOME), and all the directories in the argument list are with respect to the current directory. For example, to create the ociei.c file, the genezi utility is invoked as: genezi-create "rdbms/mesg oracore/zoneinfo ocommon/nls/admin/data" "msb nls dat">ociei.c The flag-create means to create the ociei.c source file 110 (described above in reference to FIG. 1B). The first argument is a string containing a space separated list of directories, and the second argument is another string containing a space separated list of file extensions. Please note that the path separator character (such as "/" on Unix) is platform specific.

The utility genezi first determines the list of files by searching the specified directories for any files with the specified extensions. It stores the relative path names and sizes for each file internally. It then adds all file sizes and names plus directory information to come up with the size of the array 249. In computing the sizes, each file size is rounded up and so is a file names array. The file names array is a serial byte array of offsets to all file names (i.e. pointers) where a null terminated string for each file name is stored. Pseudo-code for the create routine in the utility genezi is listed in Appendix A located at the end of this detailed description just before the claims.

Secondly, the source .c file (such as ociei.c) created in the above step is compiled and linked into a shared library such as libociei.so using the C compiler and the native linker of the operating system.

In a third step, the utility genezi uses the same list of directories and file extensions that were used to create the empty shared library (in the earlier phase). As before, utility genezi must be executed from the home directory (e.g. ORACLE_HOME) and all file names in the argument list are with respect to ORACLE_HOME. For example, to store the files 120 in the empty shared library created in the earlier phase, the utility is invoked as:

genezi-store libociei.so "rdbms/mesg oracore/zoneinfo ocommon/nls/admin/data" "msb nls dat"

The flag-store means to store the data files in the shared library. The first argument is the platform specific filename of the shared library to be operated upon, and the second argument is a string containing a space separated list of directories. The third argument is another string containing a space separated list of file extensions. Please note that the path separator character (such as "/" on Unix) is platform specific.

The utility genezi first locates the marker (e.g. defined OCIEI_PATTERN) within the shared library. Once pattern is uniquely found, the beginning of the array 249 (also called "ocieiFileBuffer" array) is located. The utility genezi then iterates over all the file names specified by the directory and extension lists, and stores them in an internal fnames array. This array is then sorted in alphabetical order so that the callback function (also called "ocieiGetFileBuffer" routine) in the shared library can perform a binary search to locate file records. After the sort, the sorted names array is written into the shared library at the appropriate places in the ocieiFileBuffer array.

The utility genezi then iterates over the sorted names list to read each file and writes its data in the file data area in the ocieiFileBuffer array. The actual number of bytes and its offset in the ocieiFileBuffer is noted in an internal "frecs" records array which contains directory information (FIG. 2B) for all files. After contents of all the files have been written, the frecs record is written in the shared library executable file 240. Pseudo-code for the store routine in the utility genezi is listed in Appendix B located at the end of this detailed description just before the claims.

A virtual file system is implemented in some embodiments, to provide a transparent interface to application(s) that access the files in the executable file, in the same manner as if the files were located in a directory and accessed through the operating system (e.g. file open, file seek, file read and file close are implemented on the executable file) as discussed next. Specifically, a low level layer of file input-output functions that is already used by the application is modified, to check for installation of executable file 240 as a shared library. If the shared library exists, then each file open by the application results in the low level layer making an invocation of a callback function (such as the ocieiGetFileBuffer routine) in the shared library that provides access to file data in executable file 240.

Such a call back function may be located in executable file 240 (FIG. 2A), for example, between the header and the marker, or alternatively after the file data but before the end of file. The callback function returns a pointer to the beginning of the file data of the named file. After that, the low level layer function translates every file read by the application to accessing bytes from the array in file 240. A simulated file pointer is kept in the low level layer for each file thus opened, and the low level layer also checks for reading beyond the available data (e.g. by use of file size as an upper limit on the application's file pointer relative to the file data offset). A simulated EOF is promptly returned by the low level layer when all the data from a file has been read.

Specifically, in one embodiment, the application tries to load the executable file. If the executable file 240 can be successfully loaded, then virtual file system initialization (such as function lfvinit in Appendix C, which appendix is also incorporated by reference herein, and is listed just before the claims) sets a flag to indicate the existence of shared library file 240 to the virtual file system (e.g. sets a virtual file system flag, e.g. variable type_lfvg, to the constant LFV_SHL_MODE). The callback descriptor of the function in executable file 240 (also called "ociei package") is passed to the initialization function in the virtual file system (such as the function lfvinit in Appendix C) for usage in calling the package's ocieiGetFileBuffer callback function.

The virtual file system "LFV" (see Appendix C) uses it's own data structures for error handling and returns error codes for error conditions. Examples of error conditions are file not found, or file not accessible due to insufficient privileges etc. The virtual file system LFV generates its own file handles of type lfvf (e.g. see Appendix C). The file handle has a pointer to file data in the shared library and the file size information. A position cursor is maintained in the lfvf file handle, for read and seek operations. Upon completion of read operations, the file handles are closed to free storage allocated for them. The virtual file system "LFV" is read-only.

During operation if an environment variable called "ORACLE_HOME" is not set, then it is set to ".", i.e. the current directory. This is because file I/O routines in the files 120 generate an absolute filename by prepending ORACLE_HOME to it, so a virtual ORACLE_HOME is necessary. The LFV layer removes the ORACLE_HOME substring from the file path of a specific file 120I to determine the relative file path. To keep track of the current ORACLE_HOME, the ORACLE_HOME value is also passed to the virtual file system initialization function lfvinit.

Although in some embodiments an executable file 240 is used to hold data from files, such an executable file can also be used to hold a file 120 of other information, such as information about the version of each file being packaged and/or patches applied to the packaged file(s). This file 120 (which identifies the version of each of the remaining files) is also called "inventory file". This file 120 may be stored in a corresponding executable file that is called "inventory library executable file" (which is different from the executable file 240 containing the remaining files 120).

In preparing the inventory library executable file, the above-described virtual file system is used by creating a ".c" file (for the inventory library executable file), and this .c file contains an array of characters to hold the inventory file 120. This character array in the inventory library executable file is updated during the build of the shared library executable file 240 to a meaningful version string.

In one particular embodiment, a version banner, e.g. in the form of a 5 digit number, is included in the inventory file. Moreover, in this embodiment a function to get the library's version banner is included in the inventory library executable file, and when invoked, it returns a string representation of the version of shared library executable file 240, which depends on the platform, as follows:

32-bit platform: Client Shared Library 32-bit—10.01.00.02.00 for 32 bit 64-bit platform: Client Shared Library 64-bit—10.01.00.02.00 for 64 bit Moreover, another function similar to the above described function is also included in the inventory library executable file, and this function returns a pointer to a string value of the version as well as any related data stored in the shared library.

One example of storage of related data is storage of the Patch information. Patch information is maintained in some embodiments as follows. First an inventory file (which lists the version of all files being packaged) is generated as follows by use of a utility called "opatch":

opatch Isinventory>opatchinv.out

Specifically, when the Oracle Database 10 g software is installed initially, it creates sub directories countering the binaries and other files required to run the software. As part of the installer an inventory of all software products installed is maintained in a well known directory. A utility to patch the installed software called "opatch" is also installed on the system. When a code defect is found by the customer and he/she cannot function without a fix for it, then Oracle Corporation supplies a one-off patch software to the customer. Note that the customer may be either an end user or an intermediary, depending on the embodiment. The customer installs the one-off patch software on their system through the "opatch" utility. The one-off patch software contains new binaries along with version information to update the existing inventory. Customer then runs the 'opatch' utility on the one-off patch software provided by Oracle Corporation. The utility "opatch" resolves patch conflicts and does version check prior to installing the one-off patch software. Once this check completes successfully it updates the installed software and the inventory file. If for any reason the check fails the patch is not applied and the error is reported. As part of post-processing (i.e. if patch is successfully applied) latest inventory information can then be obtained using the Isinventory option for "opatch" (as shown above), and this information is embedded into the shared library (inventory library executable file) as discussed next.

Next, an archiver utility called "ar" is used as shown below. This "ar" utility (included in, for example, the operating system SunOS 5.6 available from Sun Microsystems, Inc. of Santa Clara, Calif.) maintains groups of files combined into a single archive file. Its main use is to create and update library files. Therefore, the "ar" utility is used to extract an object file (named with the extension ".o") from an archive file called "libclient10.a" while maintaining the version, as follows:

ar-x $ORACLE_HOME/lib/libclient10.a ociClientVer.o

The archive file libclient10.a contains all the object files used to construct a shared library for the end user (e.g.: a large project where the code spans several hundred files one uses the library archive utility to bundle them in a single file to be provided to the linker. By doing so one does not need to provide each file to the linker and also takes care of number of character that can be entered in a shell.)

Next, inventory entries now in opatchinv.out (which was generated from "opatch" utility as noted above) are added into the object file (which was generated by the "ar" utility) as follows:

genezi-i ociClientVer.o "." opatchinv.out

Note that the inventory option of genezi utility functions in the same manner as that discussed above (see Appendices A and B) with only the following difference. There is only one file from the directory specified (e.g. in this case "opatchinv.out") that is used to generate a source file in the C language, and contents of the specified file are bundled therein. Next, the newly created ociClientVer.o file is inserted back into the archive file (and replaces its prior version) as follows:

ar-r $ORACLE_HOME/lib/libclient10.a ociClientVer.o
rm ociClientVer.o

Thereafter, the shared library (inventory library executable file) is generated as follows:

genclntsh

Note that genclntsh is a shell script that relinks the shared library containing the new objects.

Computer 100 of FIG. 1A can be implemented by hardware that forms a computer system 300 as illustrated in FIG. 3. Specifically, computer system 300 includes a bus 302 (FIG. 3) or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

As described elsewhere herein, product packaging and installation is provided by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. Local network 322 may interconnect multiple computers (as described above). For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network 328 now commonly referred to as the "Internet". Local network 322 and network 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318. In accordance with the invention, one such downloaded application provides for implementing product packaging and installation of database management systems as described herein.

The received code may be executed by processor 304 as it is received, and/or stored in storage device 310, or other non-volatile storage for later execution. In this manner, computer system 300 may obtain application code in the form of a carrier wave.

Numerous modifications and adaptations of the embodiments described herein will be apparent to the skilled artisan in view of the disclosure. For example, although in some embodiments the acts of FIG. 2C are performed automatically by a programmed computer, in other embodiments one or more of such acts are performed by the computer under manual direction (by a human).

Although in some embodiments a single executable file 240 is used as described above, in other embodiments the above described file address and/or file size and/or file name are stored in one (or more) file(s) that are in addition to the executable file (in which the above-described file data is stored). For example, the virtual directory 241 may be stored in a different file altogether. As another example file names list 242 may also be stored in the different file containing the virtual directory or in yet another different file. The just-described different files may each be a simple data file or another executable file of the type described above. Alternatively, each file name may be stored adjacent to where-ever the data for each file is written (either preceding such data or following such data), although such storage is likely to cause the pages containing each file name to be loaded in memory during a search to locate the file.

Furthermore, although in some embodiments, the data of all to-be-packaged files 120 is placed into a single array in a single executable file 140, in other embodiments such files 120 are grouped into two or more groups, and data from each group of files is then stored in its own executable file 140, thereby resulting in as many executable files 140 as there are groups.

Some embodiments use a predetermined criterion such as a sub-directory name or a file extension to enable an application vendor or an intermediary to identify (and hence select) each group of files that are to be packaged in a corresponding executable file. In such embodiments, the virtual file system, LFV, described above is enhanced to handle multiple executables as follows. In one embodiment, a selected file path prefix (such as ORACLE_HOME/rdbms) of the to-be-packaged files, and a corresponding executable file (which is to contain files in the file path prefix) is registered to (by identification to a function in) the virtual files system LFV. In many such embodiments, the prefix and the executable name are stored in a hash table.

In the just-described embodiments that create multiple executable files, any subsequent file open request to the virtual file system by invocation of a function such as lfvopen parses the full file path (identified in the request) and locates from among several executables in the hash table, one executable file that matches the registered file path prefix. For example, all files belonging to ORACLE_HOME/rdbms can be packaged in an executable file of the name librdbms.so. Then invocation of the function lfvopen in the virtual file system with ORACLE_HOME/rdbms/mesg/english.msb as the argument uses the hash table to return a file buffer in the librdbms.so executable file.

Although some implementations of the correspondence being made between partial file paths and executable file names uses a hash table, other implementations can use a sorted array with two fields in each element of the array (the fields being partial path name and a pointer to a call back routine in the corresponding executable). Moreover, alternative embodiments can use file extensions (suffixes) instead of file path prefix, to be associated with (i.e. correspond to) a matching executable file.

Moreover, although in some embodiments an array is declared in order to generate an executable file that is sufficiently large to hold the files being packaged, in other embodiments such an array may be not declared. Instead, an source file that has a function to access the file data is first created and this source file does not have (i.e. is devoid of) any statement declaring the array. After the executable file is created, that executable file is extended beyond its end to accommodate the file data and related information (e.g. virtual directory and file names list) and the size of this information being added is stored at a predetermined location relative to the new end of file (e.g. immediately therebefore). For more information on extending an executable file, see the article entitled "Writing custom data to executable files in Windows and Linux" by Daniel Polistchuck available on the Internet at community.borland.com/article/0,1410,27979,00.html. This article is incorporated by reference herein in its entirety.

Also, storage and use of the file size field in the virtual directory may be avoided in some embodiments, e.g. if a special bit pattern (e.g. one or more EOF characters) is used to denote where each file's data ends in the executable file.

Moreover, in some embodiments, other information may also be stored in executable file 240, e.g. a version number of the executable file is itself stored in one embodiment, e.g. between the marker and the virtual directory.

Accordingly numerous such modifications and adaptations are encompassed by the attached claims.

APPENDIX A

```
typedef unsigned int ub4;                  // typdef for unsigned four byte integer
typedef unsigned char oratext;             // typedef for character strings
struct slfstream;                          // abstract type of OS dependent file handle
#define LFV_MAX_PATH_SIZE          max size of a file path and name
#define GENEZI_MAXFILES            max number of files that can be packaged
#define GENEZI_PATTERN {some unique pattern}
#define GENEZI_PATLEN length of pattern
typedef struct geneziFR                    // structure of file header information
{
    ub4 offset_geneziFR;                   // offset for file data
    ub4 name_geneziFR;                     // offset for name
    ub4 size_geneziFR;                     // size of file
    ub4 attrib_geneziFR;                   // attribute of file
} geneziFR;
                                           //called with list of dirs and extensions
int genezicreate(char *dirList, char *extList)
{
```

APPENDIX A-continued

```
ub4          i;
slfstream    *fp;                                    // file pointer
oratext      fnames[LFV_MAX_PATH_SIZE][GENEZI_MAXFILES];
                                                     // array to store names
ub4          fsizes[GENEZI_MAXFILES];                // array to store sizes
ub4          nfiles = 0;                             // number of files
ub4          nameBytes = 0;                          // number of bytes in all the names
ub4          fileBytes = 0;                          // number of bytes for all file data
ub4          headerBytes;                            // number of bytes for header info
ub4          memSize;                                // number of bytes for ocieiFileBuffer
ub4          arraySize;                              // array size for ocieiFileBuffer
for (all files with the specified extensions in the directory lists)
{
        fnames[nfiles] = copy file name into fnames;
        fp = open(fnames[nfiles] for reading);
        seek_to_end(fp);
        fsizes[nfiles] = get_current_file_position(fp);
        close(fp);
        nfiles++;
}
for (i = 0; i < nfiles; i++)
{
        nameBytes += strlen(fnames[i]) + 1;          // add all name lengths
        fileBytes += (fsizes[i] + sizeof(geneziFR) −1)/sizeof(geneziFR);
                // add all file sizes, rounding them up to the
sizeof(geneziFR)
}
headerBytes = (nfiles + 2) * sizeof(geneziFR);       // 2 records for pattern and
version
memSize = headerBytes + nameBytes + fileBytes        // add storage for all items
arraySize = memSize/sizeof(geneziFR);                // as ocieiFileBuffer is an array of
geneziFR's
print out ociei.c with OCIEI_ARR_SIZE defined to be arraySize and
ocieiFileBuffer defined as:
        static const geneziFR ocieiFileBuffer[OCIEI_ARR_SIZE] =
        OCIEI_PATTERN;
}
```

APPENDIX B

```
        // called with shared library name, dir list, and extension list
int genezistore(char *shlib, char *dirList, char *extList)
{
oratext      fnames[LFV_MAX_PATH_SIZE][GENEZI_MAXFILES];
                                                     // array to store names
geneziFR     frecs[GENEZI_MAXFILES];  // header array of file info
ub4          base ;                    // base offset
ub4          nfiles;                   // number of files
for (all files with the specified extensions in the directory lists)
        store filename in the fnames array and set nfiles to number of files;
```

APPENDIX B-continued

```
sort fnames for binary search;
base = locate pattern in shared library shlib;
zero out frecs;
write sorted fnames in shlib at base + (1 + sizeof(geneziFR))*nfiles;
for all files in fnames
        write their data in shlib and store their data and name offsets in frecs;
write frecs at base after the pattern;
}
```

APPENDIX C

```
typedef unsigned char ub1;           // typdef for unsigned one byte integer
struct lslpd;                         // handle to call functions in a shared library
#define LFV_DEFAULT                   // file system in default mode
#define LFV_SHL_MODE                  // file system in shared library mode
The virtual file system LFV layer maintains a global variable lfvgbl defined as
follows:
typedef struct lfvg
{
ub1          done_lfvg;               // if this value is set to 1, lfvinit has been called
                                      // initialized to default value of 0
ub1          type_lfvg;               // type of virtual file system
lslpd        *callbackDsc_lfvg;       // callback descriptor to call routines in the
                                      // shared library
oratext      home_lfvg[LFV_MAX_PATH_SIZE];        // ORACLE_HOME
ub4          homel_lfvg;              // length of ORACLE_HOME
};
The LFV layer is initialized by calling lfvinit as described below:
                // called with the the virtual file system type, share library
                // name, and ORACLE_HOME path (and it's length)
sb4 lfvinit (ub1 vfstype, oratext *shlib, const oratext *oraclehome, ub4
```

APPENDIX C-continued

```
oraclehomel)
{
    if (lfvgbl.done_lfvg)              // someone has already done it
        return;
    if (vfstype != LFV_SHL_TYPE)
    {
        lfvgbl.type_lfvg = vfstype;
        lfvgbl.done_lfvg = 1;
        return;
    }
    lslpd *callbackDsc = load shlib;
    if (!callbackDsc)
    {
        lfvgbl.type_lfvg = LFV_DEFAULT;
        lfvgbl.done_lfvg = 1;
        return;
    }
    lfvgbl.lfvCallbackDsc_lfvg = callbackDsc;
    strncpy(lfvgbl.ohome_lfvg, oraclehome, oraclehomel);
    lfvgbl.ohome_lfvg[oraclehomel] = '\0';
    lfvgbl.ohomel_lfvg = oraclehomel + 1;   // room for null terminator
    lfvgbl.done_lfvg = 1;
}
```

The callback descriptor is used to call the ocieiGetFileBufferCallback routine in the shared library. The ORACLE_HOME value is used to match and remove the ORACLE_HOME prefix passed to file names in lfvopen.
All file I/O routines call lfvtype to see if operating in the LFV_SHL_MODE mode. If so, the corresponding LFV file I/O routine is called. The lfvtype function is defined as:

```
ub1 lfvtype( )
{
    return (lfvgbl.type_lfvg);
}
```

That is, if lfvtype returns LFV_SHL_MODE, then the data shared library is successfully loaded, and file system is operating in the shared library mode.
File handles in the LFV layer have the following structure:

```
typedef struct lfvf
{
    ub1     *buf_lfvf;      // pointer to data buffer
    ub4     size_lfvf;      // size of the file
    ub1     pos_lfvf;       // current offset in the buffer
}
```

A file is opened with the lfvopen routine described below:

```
                            // returns a valid file handle if successful
                            // returns a NULL handle is returned if error
lfvf *lfvopen(const oratext *fname)
{
    if (fname does not begin with lfvgbl.ohome_lfvg)
        return (lfvf *) NULL;
    oratext *relativeFileName = fname + lfvgbl.ohomel_lfvg;
                            // file name/path relative to
                            ORACLE_HOME
    ub4 fsize;
    ub1 *buf = ocieiGetFileBufferCallback(lfvgbl.callbackDsc_lfvg,
                            relativeFileName, &fsize);
    lfvf *fhandle = allocate(sizeof(lfvf));
    fhandle->buf_lfvf = buf;
    fhandle->size_lfvf = fsize;
    fhandle->pos_lfvf = 0;
    return fhandle;
}
```

A file is closed by calling lfvclose routine described below:

```
lfvclose(lfvf *fhandle)
{
    free(fhandle);
}
```

Data is read from the file by calling lfvread function described below:

```
                            // returns number of bytes
{                           // or negative error code
sb4 lfvread(lfvf *fhandle, ub1 *buf, ub4 nbytes)
{
    ub4 bytesToRead = min(nbytes, fhandle->size_lfvf->fhandle->pos_lfvf);
    if (!bytesToRead)
        return end of file;
    memcpy(buf, fhandle->buf_lfvf + pos_lfvf, bytesToRead);
    fhandle->pos_lfvf += bytesToRead;
    return bytesToRead;
}
```

A seek operation is performed by calling lfvseek function described below:

APPENDIX C-continued

```
lfvseek(lfvf *fhandle, ub4 offset, ub1 whence, ub4 flag);
{
    if (whence == SEEK_SET)
        fhandle->pos_lfvf = offset;
    else if (whence == SEEK_CUR)
        fhandle->pos_lfvf += offset;
}
```

What is claimed is:

1. A method of packaging a plurality of files, the method comprising:
preparing a source file comprising a declaration of an array, the array being declared to be static and to have sufficient space to accommodate at least a plurality of files to be packaged;
compiling the source file into an executable file;
overwriting the array in the executable file with data from each file in the plurality of files; and
storing in a storage device, an overwritten executable file resulting from said overwriting;
wherein said overwritten executable file in said storage device comprises said array and a header of a format specific to an operating system.

2. The method of claim 1 wherein:
the space in the array is declared to be sufficiently large for the array to also hold an address of each file; and
the address of a location of data of each file in the plurality of files is also written into the executable file during said overwriting.

3. The method of claim 2 further comprising, prior to said preparing:
determining at least (a) total number of files in the plurality of files, (b) total size of data based on space occupied on a storage media by files in the plurality of files, and (c) total length of names of files in the plurality of files;
wherein the space in the array is declared to be sufficiently large for the array to also hold the name of each file in the plurality of files; and
wherein the name of each file in the plurality of files is also written in the executable file during said overwriting.

4. The method of claim 3 further comprising:
overwriting the executable file with an additional address of another location at which the name of each file is stored.

5. The method of claim 4 wherein:
the address of each file and the additional address of the name of each file are located adjacent to one another, in a directory in the executable file.

6. The method of claim 5 further comprising:
overwriting the executable file with the size of each file;
wherein the directory comprises an entry for each file, and the entry comprises the address, the additional address, and the size.

7. The method of claim 6 further comprising:
overwriting the executable file with a description of version of each file;
wherein the entry comprises the description of version.

8. The method of claim 1 further comprising:
overwriting another executable file with a description of version of each file.

9. The method of claim 1 further comprising:
overwriting the executable file with a description of version of each file;
wherein all descriptions are in a portion of the executable file separate and distinct from the directory.

10. The method of claim 1 wherein:
the source file is prepared to include a predetermined bit pattern; and
the overwriting is performed relative to the predetermined bit pattern.

11. The method of claim 10 further comprising:
checking if the predetermined bit pattern occurs more than once in the executable file and if so then re-preparing the source file using a different predetermined bit pattern.

12. The method of claim 1 wherein:
the source file is prepared to include a call back function to receive a file name as input, and to return a pointer to the location of data of a file having said file name.

13. The method of claim 12 wherein:
the names of the plurality of files are stored in the executable file, sorted in alphabetical order; and
the call back function is written to perform a binary search on the file name received as input.

14. The method of claim 12 further comprising:
editing at least one additional source file of an application to replace a call to a function to open a file, with software comprising an invocation to the call back function.

15. The method of claim 14 wherein:
the invocation in the software is made conditionally, only if a flag, indicating presence of the executable file, is set.

16. The method of claim 12 further comprising:
preparing software to receive the pointer as one input and an address of a buffer as another input, and to return a copy of the data at said pointer in said buffer.

17. The method of claim 1 further comprising:
preparing software to receive a file name as input, and to return a pointer to the location of data of a file having said file name.

18. A computer-readable storage medium encoded with instructions to perform the method of claim 1.

19. A computer-readable storage medium encoded with an overwritten executable file resulting from overwriting of the executable file in the method of claim 1.

20. A computer comprising a processor and a memory coupled to the processor, the memory being encoded with instructions to:
automatically prepare a source file comprising a statement declaring an array to be static and of sufficient space to accommodate a plurality of files to be packaged, the name of each file in the plurality of files, and an address for each file in the plurality of files;
automatically compiling the source file into an executable file;
automatically overwriting the executable file with at least: data from each file in the plurality of files, the name of each file in the plurality of files, and an address of a location of data of each file in the executable file; and automatically storing in a storage device, an overwritten executable file resulting from said automatically overwriting;

wherein said overwritten executable file in said storage device comprises said array and a header of a format specific to an operating system.

21. An apparatus for packaging a plurality of files, the apparatus comprising:

means for automatically preparing a source file comprising an array declared to be static and have sufficient space to accommodate a plurality of files to be packaged, the name of each file in the plurality of files, and an address for each file in the plurality of files;

means for automatically compiling the source file into an executable file;

means for automatically overwriting the executable file with at least: data from each file in the plurality of files, the name of each file in the plurality of files, and an address of a location of data of each file in the executable files; and means for automatically storing in a storage device, an overwritten executable file output by said means for automatically overwriting;

wherein said overwritten executable file in said storage device comprises said array and a header of a format specific to an operating system.

22. A method of packaging a plurality of files, the method comprising:

determining (a) total number of files in the plurality of files, (b) total size of data of files in the plurality of files, and (c) total length of names of files in the plurality of files;

preparing a source file comprising a predetermined bit pattern and a declaration of an array, the array being declared to be static and to have space derived from the total number, the total size and the total length;

compiling the source file into an executable file; and overwriting a first region in the executable file with the name of each file in the plurality of files, wherein the first region is in the array at a first location relative to the predetermined bit pattern;

overwriting a second region of the executable file with data from each file in the plurality of files, wherein the second region is in the array at a second location relative to the predetermined bit pattern;

maintaining in memory a directory, with an entry for each file in the plurality, the entry comprising the size of each file in the executable file, an address of a location of data of each file in the executable file, and an additional address of another location at which the name of each file is stored;

overwriting a third region of the executable file with said directory, wherein the third region is in the array at a third location relative to the predetermined bit pattern; and storing in a storage device, an overwritten executable file resulting from said overwritings;

wherein said overwritten executable file in said storage device comprises said array and a header of a format specific to an operating system.

23. The method of claim 22 wherein the source file is prepared to comprise a function to perform a binary search on the file names to be stored in the first region, the method further comprising:

sorting the names of the plurality of files prior to any overwriting;

wherein during said overwriting in the first region, the names of the plurality of files are stored sorted in alphabetical order to facilitate said binary search.

24. The method of claim 23 further comprising:

editing at least one source file of an application to insert a call to said function to perform binary search, in place of a call to open a file in an operating system;

compiling the application; and distributing, to a plurality of end users, the compiled application and the executable file obtained from said overwriting.

25. A method of packaging a plurality of files, the method comprising:

preparing an executable file comprising a static array, the static array being of sufficient space to accommodate at least a plurality of files to be packaged;

overwriting the static array in the executable file with data from each file in the plurality of files; and storing in a storage device, an overwritten executable file resulting from said overwriting;

wherein said overwritten executable file in said storage device comprises said static array and a header of a format specific to an operating system.

26. The method of claim 25 wherein:

the executable file is prepared directly without compilation of a source file.

27. The method of claim 25 wherein:

the executable file is prepared by compiling and linking a source file having a statement that declares said array.

28. The method of claim 25 wherein:

said plurality of files is a subset of a complete set of files available for use with an application program; and the method further comprises selecting said plurality of files from said complete set depending on an attribute of an end user of the application program.

* * * * *

UNITED STATES PATENT AND TRADEMARK OFFICE
CERTIFICATE OF CORRECTION

PATENT NO.       : 7,412,700 B2                               Page 1 of 1
APPLICATION NO.  : 10/848635
DATED            : August 12, 2008
INVENTOR(S)      : Lari et al.

It is certified that error appears in the above-identified patent and that said Letters Patent is hereby corrected as shown below:

On the Title Page, under ("Assistant Examiner"), line 1, delete "Hahn" and insert -- Hanh --, therefor.

On the Title Page on page 2, Item -56-, under "Other Publications", line 1, delete "retreived" and insert -- retrieved --, therefor.

On the Title Page on page 2, Item -56-, under "Other Publications", line 4, delete "Retreived" and insert -- Retrieved --, therefor.

In column 1, line 61, delete "thereof" and insert -- thereof) --, therefor.

In column 15–16, in Appendix A, line 1, delete "// typdef" and insert -- // typedef --, therefor.

In column 17–18, in Appendix C, line 1, delete "// typdef" and insert -- // typedef --, therefor.

Signed and Sealed this

Sixteenth Day of March, 2010

David J. Kappos
*Director of the United States Patent and Trademark Office*